(12) United States Patent
Mannhart

(10) Patent No.: US 6,581,436 B2
(45) Date of Patent: Jun. 24, 2003

(54) PRESSURE SENSOR WITH MEANS FOR RE-CALIBRATION

(75) Inventor: Eugen Mannhart, Cham (CH)

(73) Assignee: ESEC Trading SA, Cham (CH)

( * ) Notice: Subject to any disclaimer, the term of this patent is extended or adjusted under 35 U.S.C. 154(b) by 0 days.

(21) Appl. No.: 10/150,180

(22) Filed: May 16, 2002

(65) Prior Publication Data
US 2002/0178826 A1 Dec. 5, 2002

(30) Foreign Application Priority Data
May 16, 2001 (CH) .................................... 0926/01

(51) Int. Cl.⁷ ................................................ G01L 27/00
(52) U.S. Cl. ........................................................ 73/1.68
(58) Field of Search .......................... 73/706, 715, 716, 73/717, 725, 722, 728, 730, 756, 1.57, 1.63, 1.64, 1.68, 1.71

(56) References Cited

U.S. PATENT DOCUMENTS 4,227,420 A * 10/1980 Lamadrid ..................... 73/756
4,976,151 A * 12/1990 Morishita ..................... 73/730
6,255,609 B1 * 7/2001 Samuelson et al. ........ 200/83 L

FOREIGN PATENT DOCUMENTS

| EP | 579 504 | 7/1993 | ............. G01L/9/14 |
| EP | 928 637 | 1/1999 | ............. B05C/5/02 |

* cited by examiner

Primary Examiner—William Oen
(74) Attorney, Agent, or Firm—Thelen Reid & Priest LLP; David B. Ritchie

(57) ABSTRACT

A pressure sensor for measuring a pressure p contains a membrane with a front and a rear clamped into a body. The pressure p can be applied to the rear of the membrane. The front of the membrane is actively linked to a piston. In addition, a force transmitter is present with which a predetermined force can be applied to the piston. For the purpose of re-calibration, the membrane of the pressure sensor can be deformed by the force transmitter under precisely defined conditions and the output signal re-calibrated. A positioner can also be foreseen instead of the force transmitter.

6 Claims, 1 Drawing Sheet

PRESSURE SENSOR WITH MEANS FOR RE-CALIBRATION

PRIORITY CLAIM

Figure 1:
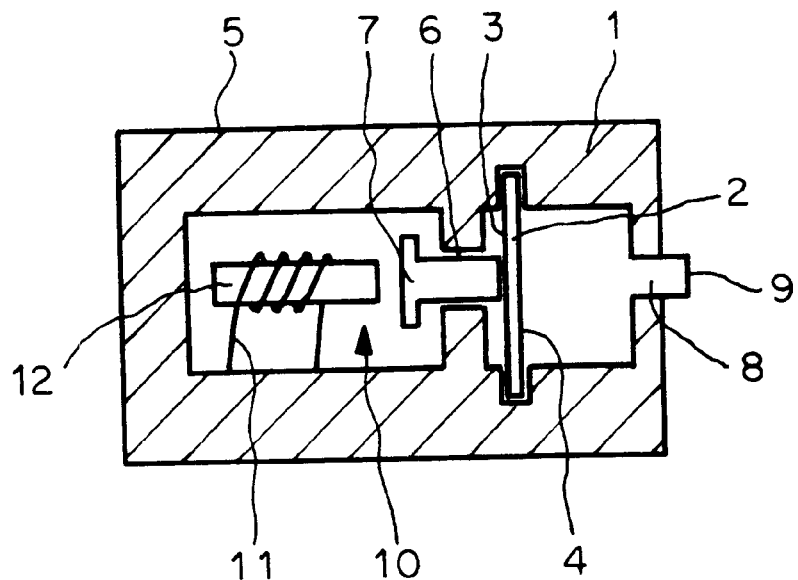

The present application claims priority under 35 U.S.C §119 based upon Swiss Patent Application No. 2001 0926/01 filed May 16, 2001.

FIELD OF THE INVENTION

The invention concerns a pressure sensor.

BACKGROUND OF THE INVENTION

With the mounting of semiconductor chips, the semiconductor chips are bonded to the substrate with an epoxy adhesive. In doing so, it is necessary that a precisely defined amount of adhesive is applied to the substrate. Application of the adhesive takes place for example with a dispensing nozzle as is described in the European patent application EP 928637. A pressure pulse is applied to the adhesive in the dispensing nozzle. Pressure sensors are used to control the pressure pulse.

A pressure sensor suitable for such measurements is offered by Honeywell under the designation 22 PC series. Basically, the pressure sensor comprises a membrane clamped in a body the deflection of which is measured in comparison with the body. For this purpose, piezoresistors are integrated into the surface of the membrane. In a first embodiment, there are pressure sensors for measuring a relative pressure with which the pressure to be measured is applied to the front of the membrane while the rear of the membrane is in contact with the ambient air. In a second embodiment, there are also pressure sensors for measuring an absolute pressure with which the rear of the membrane is sealed air-tight against the ambient air. The disadvantage with these sensors is that both the zero line as well as the characteristic curve change as time goes on which demands re-calibration at specific time intervals.

The object of the invention is to propose a pressure sensor which can be calibrated in a simple way.

BRIEF DESCRIPTION OF THE INVENTION

The invention is based on the knowledge that force sensors from Honeywell of the same family as the above-mentioned pressure sensors are available on the market under the series FSG and FSL. With these force sensors, the force to be measured is transmitted to the membrane via a piston. On the one hand, such a force sensor is now expanded with a force transmitter or a positioner and, on the other hand, is modified so that the pressure to be measured can be applied to the side of the membrane facing away from the piston. In normal operation of the pressure sensor, the force transmitter or positioner have no function. The force transmitter or positioner serve only for the calibration of the pressure sensor. For the calibration of the pressure sensor, the membrane is deformed under defined conditions and then the output signal of the pressure sensor is ascertained. The deformation of the membrane is achieved either under the influence of a predetermined force exerted by the force transmitter on the piston, or by means of shifting the piston into a precisely defined position.

The pressure sensor can be used for measuring an over-pressure as well as an underpressure or vacuum.

In the following, embodiments of the invention are explained in more detail based on the drawing.

BRIEF DESCRIPTION OF THE DRAWING FIGURES

The accompanying drawings, which are incorporated into and constitute a part of this specification, illustrate one or more embodiments of the present invention and, together with the detailed description, serve to explain the principles and implementations of the invention. The figures are not to scale.

Figure 2:
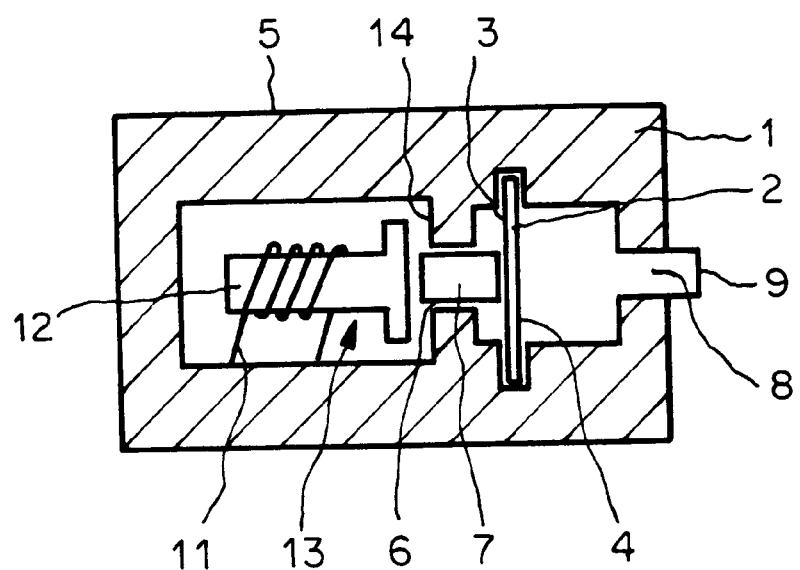

FIG. 1 shows a first embodiment of a pressure sensor in accordance with the invention with a force transmitter, and FIG. 2 shows a second embodiment of a pressure sensor in accordance with the invention with a positioner.

DETAILED DESCRIPTION OF THE INVENTION

FIG. 1 shows a cross-section of a first embodiment of a pressure sensor in accordance with the invention. The pressure sensor has a body 1 in which a membrane 2 is clamped. The membrane 2 has a front 3 and a rear 4. The body 1 is part of a housing 5 or is located inside of a housing 5. The housing 5 has a first drill hole 6 which accepts a piston 7. The piston 7 acts on the front 3 of the membrane 2. The housing 5 has a second drill hole 8 with a nipple 9 formed as a pressure connection. The second drill hole 8 is located opposite the rear 4 of the membrane 2 so that the pressure p applied to the pressure connection acts on the rear 4 of the membrane 2. In addition, the pressure sensor has a force transmitter 10 which acts on the piston 7 during calibration. The force transmitter 10 is preferably an electromagnet with a magnet 12 which can be moved horizontally back and forth driven by a coil 11 which has current flowing through it. In normal operation, the deflection of the membrane 2 as a result of the pressure p or, during calibration, as a result of the piston 7 is measured and converted into an electrical signal: As output signal, the pressure sensor delivers an electrical voltage U(p) which is dependent on the pressure p.

The membrane 2 can be made, for example, out of a metal and the deflection of the membrane 2 can be measured, for example, with a rigidly arranged coil. However, the membrane 2 is preferably a silicon chip with piezoresistive paths integrated into the front 3 or rear 4.

In a first variant, the wall of the housing 5 surrounding the rear 4 of the membrane 2 is closed as presented in FIG. 1 so that the rear 4 of the membrane 2 is sealed air-light against the ambient air. In this way, the pressure sensor measures the absolute pressure acting on the front 3 of the membrane 2. In a second variant, the wall of the housing 5 surrounding the rear 4 of the membrane 2 has a drill hole so that the rear 4 of the membrane 2 is in contact with the ambient air. In this way, the pressure sensor measures the pressure acting on the front 3 of the membrane 2 relative to the prevailing ambient pressure. In a third variant, the pressure sensor is designed to measure a differential pressure $p_1-p_2$ in that a first pressure $p_1$ can be applied to the front 3 of the membrane 2 and a second pressure $p_2$ to the rear 4 of the membrane 2.

The piston 7 is preferably secured to the magnet 12 and does not touch the membrane 2 in normal operation. In this way, only the pressure p applied to the pressure connection acts on the membrane 2. The piston 7 can however be secured to the membrane 2 as shown in FIG. 1, whereby it does not touch the magnet 12 in normal operation.

Calibration or re-calibration of the pressure sensor takes place according to the following steps:
1. The supply of pressure to the pressure connection is interrupted so that the prevailing ambient pressure is applied to the pressure connection. Afterwards, the output signal $U_0(p=0)$ of the pressure sensor is recorded and saved.

2. The force transmitter 10 is actuated so that it exerts a predetermined force F on the piston 7 of the pressure sensor. The piston 7 acts on the membrane 2 and deflects it corresponding to the force F. For doing so, in this example, a predetermined current $I_1$ is applied to the coil 11 of the electromagnet as a result of which the magnet 12 acts on the piston 7 with a force corresponding to the current $I_1$. Afterwards, the output signal $U_1(I_1)$ of the pressure sensor is recorded and saved.

The relationship between the current $I_1$ flowing through the coil 11 and the force $K_1(I_1)$ exerted on the piston 7 by the magnet 12 does not change in the course of time. Furthermore, the force $K_1(I_1)$ corresponds to a specific pressure $p_1(I_1) = K_1(I_1)/A$, whereby the value A is a constant. The pressure $p_1(I_1)$ acting on the piston 7 of the pressure sensor on applying the current $I_1$ to the force transmitter 10 must therefore only be measured and saved one single time during manufacture of the pressure sensor. Moreover, it is so that the relationship $p_1(I_1)$ is the same for all pressure sensors. In this way, in step 2, the sensor signal $U_1(I_1)$ can be assigned to the corresponding pressure $p_1$ and one gets $U_1(p_1)$ In the event that the characteristic curve of the pressure sensor is linear within the desired working range, ie;

$$U(p) = U_0 + k*p \quad (1)$$

whereby $U_0$ and k are constants, then it suffices to carry out the calibration under the two previously named conditions. With the calibration, one then gets the new value for the constant k as $$k = \frac{U_1(p_1) - U_0}{p_1} \quad (2)$$

In the event that the characteristic curve is non-linear, then step 2 is carried out with a number n of different currents $I_1$ to $I_n$.

A spring can also be used as the force transmitter.

FIG. 2 shows a cross-section of a second embodiment of the pressure sensor in accordance with invention with which, instead of the force transmitter 10, a positioner 13 is present. With the positioner, it is also possible to recalibrate the pressure sensor at any time. The positioner 13 consists, for example, of the rigidly arranged coil 11 and the movable magnet forming the electromagnet 12. The body 1, or the electromagnet, has a surface 14 serving as a stop for the magnet 12. For calibration with the positioner 13, the piston 7 is brought into a predetermined position and in this way, the membrane 2 is deformed in a controlled manner.

Here also, the piston 7 does not touch the membrane 2 in normal operation of the pressure sensor: Therefore, only the pressure p applied to the pressure connection acts on the membrane 2.

Calibration or re-calibration of the pressure sensor takes place according to the following steps:

1. The supply of pressure to the pressure connection is interrupted so that the prevailing ambient pressure is applied to the pressure connection. Afterwards, the output signal $U_0(p=0)$ of the pressure sensor is recorded and saved.
2. The positioner 13 is actuated so that, by means of the piston 7, the membrane 2 of the pressure sensor is brought into a predetermined position. For doing so, with this example, a predetermined current is applied to the coil 11 of the electromagnet which is sufficient to bring the magnet 12 to a stop on the surface 14. Afterwards, the output signal $U_1$ of the pressure sensor is recorded and saved.

With step 2, the membrane 2 is deformed relative to its neutral position under defined conditions and brought into a position L. The pressure $p_1$ which belongs to position L must only be determined once during the manufacturing process. This can be done, for example, in that the positioner 13 is first actuated and then the output signal $U_w$ of the pressure sensor is saved. Afterwards, the positioner 13 is reset and an increasing pressure p is applied to the membrane 2 via the pressure connection. The pressure p is increased until the output signal of the pressure sensor assumes the value $U_w$ and is then saved as pressure $p_1$.

After step 2 of the calibration therefore, the constant k of formula (1) can again be determined according to formula (2).

A pneumatic drive can also be used as the positioner.

With this embodiment with the positioner, the wall of the housing 5 surrounding the rear 4 of the membrane 2 as shown in FIG. 2 can also be formed closed in order to measure the absolute pressure or this wall can have a drill hole in order to measure the pressure relative to the ambient pressure or the pressure sensor can be designed to measure a differential pressure.

The pressure p acting on the rear 4 of the membrane 2 can be an overpressure or an underpressure. This means that the pressure sensor can also be used as a vacuum sensor.

With the examples explained above, the effect of the pressure p or the piston 7 takes place on different sides of the membrane 2: The piston 7 effects the front 3, the pressure p effects the rear 4. Although for constructional reasons this is advantageous, the pressure sensor can also be constructed so that the pressure p effects the same side of the membrane 2 as the piston 7. In this case, the pressure connection 9 should be placed differently to the presentation in FIGS. 1 and 2 so that the supplied pressure p effects the front 3 of the membrane 2.

What is claimed is:

1. Pressure sensor for measuring a pressure, comprising:
   a membrane with a front and a rear clamped in a body, whereby in operation pressure is applied to the front or the rear of the membrane,
   a piston, and
   a force transmitter for producing upon actuation a force for calibrating the pressure sensor, the force being transmitted by the piston to the front of the membrane for deforming the membrane.

2. Pressure sensor according to claim 1, wherein the force transmitter is an electromagnet formed from a coil and a magnet.

3. Pressure sensor according to claim 2, wherein the piston is secured to the magnet.

4. Pressure sensor for measuring a pressure, comprising:
   a membrane with a front and a rear clamped in a body, whereby in operation pressure is applied to the front or the rear of the membrane,
   a piston, and
   a positioner for shifting the piston into a predetermined position for deforming the membrane for calibrating the pressure sensor.

5. Pressure sensor according to claim 4, wherein the positioner is an electromagnet formed from a coil and a magnet and wherein a surface serves as a stop for defining the predetermined position of the positioner.

6. Pressure sensor according to claim 5, wherein the piston is secured to the magnet.

* * * * *